3,297,675
HALOGENATED POLYETHYLENE
Robert Fuhrmann, Morris Plains, Fred W. Koff, Clifton, and David Jerolamon, Morris Township, Morris County, N.J., assignors to Allied Chemical Corporation, New York, N.Y., a corporation of New York
No Drawing. Filed Dec. 23, 1963, Ser. No. 332,952
12 Claims. (Cl. 260—94.9)

This invention relates to a process for bromo-chlorinating polyethylene and more particularly to the bromo-chlorination of chlorinated polyethylene to obtain a product which exhibits excellent cross-linking characteristics.

While chlorinated polyethylene has been brominated to obtain a bromo-chlorinated product, the prior art methods utilize bromine itself, which is expensive, and the product obtained was never cured. As a result, bromo-chlorinated polyethylene has had little application.

In accordance with the present invention, it has been discovered that chlorinated polyethylene may be treated so as to be simultaneously both brominated and further chlorinated, without using bromine itself as the initial source of bromine ions or radicals. Further it has been discovered that the bromo-chlorinated polyethylene of the present invention may be cross-linked to give a product having both high tensile strength and elastic modulus.

It is therefore an object of the present invention to provide an improved process for brominating chlorinated polyethylene.

A further object of the present invention is to provide a method of simultaneously brominating and chlorinating a chlorinated polyethylene.

Another object of the present invention is to provide a bromo-chlorinated polyethylene which can be readily cross-linked into a product having both a high tensile strength and a high elastic modulus, together with a high elongation.

Additional objects and advantages of the invention will become apparent from the following detailed description thereof.

According to the present invention, chlorinated polyethylene, a water soluble bromide and chlorine are interacted in an aqueous suspension of finely divided chlorinated polyethylene whereby the polymer is further chlorinated and at the same time is brominated. The chlorine evidently further chlorinates the chlorinated polyethylene and also releases bromine from the bromide in the reaction mixture; and this released bromine effects a bromination of the chlorinated polyethylene. Preferably the chlorine is introduced into the aqueous medium after the water-soluble bromide, but all or part of the chlorine may be added before the bromide. Illumination of these reaction mixtures is unnecessary. The bromo-chlorinated polymer formed may be recovered from the aqueous medium by filtration or other conventional means.

Although other chlorinated polyethylenes can be used, chlorinated polyethylenes preferred for use as starting materials are amorphous, linear, high molecular weight chlorinated polyethylenes having chlorine content from about 20% to about 45% by weight. These starting materials give final products with particularly good elastomer properties. Preferred chlorinated polyethylene starting materials can be prepared by chlorinating a high density, high molecular weight polyethylene such as that disclosed in Cawthon and Joris U.S. Patent 3,050,514, issued August 21, 1962. The weight average molecular weight of the polyethylene to be chlorinated can be as low as about 20,000; and a preferred range is 500,000–5,000,000. When a high density, crystalline polyethylene is to be chlorinated, the polymer is preferably chlorinated to produce an amorphous chlorinated product. This can be accomplished by chlorinating high molecular weight polyethylene according to the method set forth in Chapman et al. French Patent 1,316,044, issued December 17, 1962, in which a step of the chlorination is carried out upon solid polymer above the crystalline melting point of the polyethylene. Lower molecular weight polymers can be converted to amorphous chlorinated products by chlorinating in solution. The preferred chlorinated polyethylene starting materials have intrinsic viscosities, as determined in o-dichlorobenzene solvent at 100° C., from about 0.2 to about 5 deciliters per gram. They are largely or completely amorphous as shown by their relatively low glass transition temperatures or brittle points, which generally range down from about 0° C. to about −25° or −30° C. as chlorine content ranges down from about 45% to about 20% by weight; and in any event the glass transition temperature of the preferred starting materials will not exceed 20° C.

If the method used to chlorinate the polyethylene results in an aqueous suspension of the polymer, this suspension may be used directly in the bromo-chlorination of the present invention as long as no interfering reactants are present.

The reaction between the chlorinated polyethylene, the water soluble bromide and the chlorine may be carried out at temperatures in the range of about 10° to 190° C. Optimum results are obtained when the reaction mixture is maintained within the temperature range of about 80° to 150° C.

The bromides suitable for use in the present invention are the water soluble bromides preferably those of alkali metals and alkaline earth metals. Particularly useful are the readily available bromides of potassium, sodium and lithium. Theoretically one half of the bromine content of the bromide is introduced into the polymer, and one half is used in the formation of HBr. In actual practice it was found that some of the HBr was oxidized according to the equation:

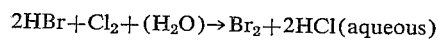

and that more than one half of the bromine content of the bromide was introduced into the polymer. The bromine content of the final product may be varied as desired, with satisfactory results being obtained with a final bromine content in the range of 0.2–10%.

The chlorine content of the final bromo-chlorinated product may also be varied as desired but is preferably kept within the range of about 20–48%.

The bromo-chlorinated polyethylene obtained by the present invention may be readily cross-linked with any of the conventional curing agents used in the cross-linking of chloro-sulfonated polyethylenes. Suitable curing agents include metal oxides such as the oxides of magnesium, calcium, strontium, barium, lead and zinc; organic salts such as the maleates, stearates, fumarates and acetates of the above listed metals and organic peroxides and hydro-peroxides such as cumyl peroxide, cumyl hydroperoxide, benzoyl peroxide, di-t-butyl peroxide, 2,5-dimethyl - 2 - 5 - di(t - butylperoxy)hexyne 3, and 2,5-dimethyl - 2 - 5 - di(t - butylperoxy)hexane. The abovementioned metal oxides, and particularly magnesium oxide, have been found to be especially effective. The curing agents may be used alone, but for best results should be combined with sulfur or a sulfur-containing accelerator such as dipentamethylenethiuram tetrasulfide, 2-mercaptobenzothiazole, benzothiarzyl disulfide, 2-mercaptoimidazole and tetramethylthiuram disulfide. Pigments, fillers and processing aids may be incorporated into the product as desired before the cross-linking is effected.

Comparative tests with cured chlorinated polyethylenes which do not contain bromine reveal that the brominated products obtained by the present invention exhibit superior tensile strength and modulus will increase, and elongation high elongation. In particular, preferred products of this invention are cross-linked bromo-chlorinated polyethylenes having a chlorine content of about 20%–48% by weight and a bromine content of about 0.2%–10% by weight; and having ultimate tensile strength of about 1500–3000 p.s.i.; 300% modulus of about 500–1000 p.s.i.; and ultimate elongation of about 300–600%. Generally tensile strength and molulus will increase, and elongation will decrease, as extent of cross-linking increases.

The following examples describe completely specific embodiments of our invention and illustrate the best modes contemplated by us of carrying out our invention; but it is to be understood that the invention is not to be limited by all details of the examples.

In the examples ultimate tensile strength, percent ultimate elongation and 300% modulus were determined by ASTM method D–638; glass transition temperature was determined using the Clash-Berg method of measuring stiffness as set forth in ASTM D–1043–61–T, taking as the glass transition temperature or brittle point that temperature at which the stiffness is $1.45 \times 10^4$ p.s.i. (i.e. $10^9$ dynes/cm.); and intrinsic viscosity was determined by extrapolating to infinite dilution the reduced viscosities measured in o-dichlorobenzene solvent at 100° C. and 0.1 gram per deciliter concentration.

EXAMPLE 1

An aqueous slurry was formed in a reactor by mixing therein 300 grams of de-ionized water, 0.74 gram of KBr, and 12.0 grams of chlorinated amorphous polyethylene having a chlorine content of 25.6%, a glass transition temperature of −26° C., and an intrinsic viscosity of 3.8 dl./gm. This chlorinated polymer was produced in accordance with Example 3 of the above-cited Chapman et al. French Patent 1,316,044.

The reactor containing the above slurry was evacuated, flushed with nitrogen, and heated to 90° C. The reactor was then evacuated again and chlorine was introduced at a pressure of 6 p.s.i.g. for 5 minutes. The introduction of chlorine was then stopped, the reactor closed, and the reaction allowed to continue for an additional 25 minutes at 90° C. After a total reaction time of 30 minutes the reactor was flushed with nitrogen and cooled under nitrogen.

The reaction mixture was filtered and the recovered polymer washed with water. The polymer was then dried under vacuum at 55° C. for 20 hours. The dried polymer weighed 13.1 grams showing a weight gain of 1.1 grams. Analysis of the polymer indicated:

Bromine=2.43% by weight;
Chlorine=29.13% by weight;
Intrinsic viscosity=3.86 dl./gm.;
Glass transition temperature=−23° C.

Analysis of the filtrate for bromine and chlorine indicated 0.39% Cl, but no bromine was found.

EXAMPLE 2

The procedure of Example 1 was repeated except three time sas much KBr was used (2.22 grams). The weight of dry polymer obtained was 15.2 grams indicating a weight change of 3.2 grams.

Analysis of the polymer showed:

Bromine=7.85% by weight;
Chlorine=27.22% by weight;
Intrinsic viscosity=3.53 dl./gm.;
Glass transition temperature=−25° C.

Analysis of the filtrate for bromine and chlorine indicated 0.53% chlorine, but no bromine was found.

EXAMPLE 3

Curing of bromo-chlorinated polymer

This procedure was carried out starting with 80 grams of bromo-chlorinated polyethylene produced essentially as in Example 1, but using somewhat lower molecular weight and less amorphous starting material. The bromo-chlorinated polymer had the following characteristics:

Bromine=1.15% by weight;
Chlorine=25.6% by weight;
Intrinsic viscosity=2.52 dl./gm.;
Glass transition temperature=−21° C.

This bromo-chlorinated polyethylene was milled on a conventional rubber mill for 6 minutes at 130° C. with 28.0 grams of $TiO_2$, 40.0 grams of whiting (finely ground $CaCO_3$), 2.4 grams of pentaerythrol and 28.0 grams of a liquid chlorinated paraffin wax having about 40% by weight chlorine content. The product was formed into a sheet. This sheet was cooled to room temperature and milled with 3.2 grams of MgO, and 0.8 gram of dipentamethylenethiuram tetrasulfide to form a tough white sheet. The sheet was heated for 60 minutes at 150° C.

Physical properties of the resulting cured sheet were:

Ultimate tensil strength=1636 p.s.i.
Ultimate elongation=558%.
300% modulus=730 p.s.i.

Comparison

A sample of chlorinated polyethylene identical with the starting material used for producing the bromo-chlorinated polymer employed in Example 3 was cured by essentially the procedure of Example 3. The physical properties of the resulting sheet were found to be:

Ultimate tensile strength=1039 p.s.i.
Ultimate elongation=582%
300% modulus=431 p.s.i.

This comparison with the results obtained of Example 3 indicates that the introduction of bromine into chlorinated polyethylene greatly increases the ultimate tensile strength and 300% modulus obtainable upon curing the product, while at the same time maintaining high ultimate elongation, well above 300%. These superior properties are a result of the improved cross-linking behaviour imparted by the bromine.

In the above discussion and examples the polyethylene specifically referred to is ethylene homopolymer. However it will be appreciated that the same general results can be obtained using chlorinated ethylene copolymers wherein ethylene is the predominant constituent. Accordingly the term "chlorinated polyethylene" herein and in the accompanying claims is to be interpreted as including such copolymers in its broad scope.

It will be apparent that many modifications and variations may be effected without departing from the scope of the novel concepts of the present invention and the illustrative details disclosed are not to be construed as imposing unnecessary limitations on the invention.

We claim:

1. A process for the bromo-chlorination of chlorinated polyethylene comprising interacting chlorinated polyethylene, a water soluble bromide of a metal selected from the group consisting of alkali metals and alkaline earth metals and chlorine in an aqueous medium whereby said chlorinated polyethylene is both brominated and further chlorinated.

2. A process as claimed in claim 1, wherein said chlorinated polyethylene starting material has intrinsic viscosity as determined in o-dichlorobenzene at 100° C. in the range from about 0.2 to about 5 dl./gm. and has glass transition temperature not exceeding 20° C.

3. A process as claimed in claim 2, wherein said chlorinated polyethylene contains between about 20–45% chlorine by weight.

4. A process as claimed in claim 1, wherein the bromo-chlorinated polyethylene obtained has a bromine content of between about 0.2–10%.

5. A process as claimed in claim 1, wherein said bromide is a salt of an alkali metal.

6. A process as claimed in claim 5, wherein said alkali metal is selected from the group consisting of sodium, lithium and potassium.

7. A process as claimed in claim 1, wherein said bromide is a salt of an alkaline earth metal.

8. A process as claimed in claim 1, including the additional steps of recovering the bromo-chlorinated polyethylene from said aqueous medium and curing said bromo-chlorinated polyethylene by heating with a metal oxide curing agent to form a cross-linked final product.

9. A process as claimed in claim 8, wherein said cure is effected using a metal oxide curing agent in combination with at least one member selected from the group consisting of sulfur and sulfur-containing accelerators of curing.

10. A process for the bromo-chlorination of linear, amorphous, chlorinated polyethylene having intrinsic viscosity as determined in o-dichlorobenzene at 100° C. in the range from about 0.2 to about 5 dl./gm.; having glass transition temperature not exceeding 20° C.; and having chlorine content about 20–45%; said process comprising adding a bromide of a metal selected from the group consisting of sodium, potassium, and lithium, to an aqueous suspension of said linear, amorphous, chlorinated polyethylene and introducing chlorine into said bromide-containing aqueous suspension whereby said chlorinated polyethylene is both brominated and further chlorinated to bromine content in the range from 0.2% to 10% by weight and chlorine content not above 48% by weight.

11. A process as claimed in claim 10, including the additional steps of recovering the bromo-chlorinated polyethylene from said aqueous suspension and curing said bromo-chlorinated polyethylene by heating with a metal oxide curing agent to form a cross-linked final product.

12. A process as claimed in claim 11, wherein said cure is effected using a metal oxide curing agent in combination with a member selected from the group consisting of sulfur and sulfur-containing accelerators of curing.

References Cited by the Examiner

UNITED STATES PATENTS

| | | | |
|---|---|---|---|
| 2,416,069 | 2/1947 | Scott | 260—94.9 |
| 2,850,490 | 9/1958 | Canterino et al. | 260—94.9 |
| 2,913,449 | 11/1959 | Hoerger et al. | 260—94.9 |
| 3,033,838 | 5/1962 | Ray | 260—85.3 |

FOREIGN PATENTS

| | | |
|---|---|---|
| 580,334 | 7/1959 | Canada. |
| 828,938 | 2/1960 | Great Britain. |

JOSEPH L. SCHOFER, *Primary Examiner.*

L. EDELMAN, *Assistant Examiner.*

JAMES A. SEIDLECK, *Examiner.*